Inventor
PIERRE RAOUL ROGER AIGRAIN
By Robert Harding Jr.
Attorney

Feb. 4, 1958 P. R. R. AIGRAIN 2,822,131

IMPULSE MULTIPLYING ARRANGEMENTS FOR ELECTRIC COMPUTING MACHINES

Filed April 28, 1954 4 Sheets-Sheet 2

Inventor
PIERRE RAOUL ROGER AIGRAIN

By Robert Harding Jr.
Attorney

Feb. 4, 1958 P. R. R. AIGRAIN 2,822,131

IMPULSE MULTIPLYING ARRANGEMENTS FOR ELECTRIC COMPUTING MACHINES

Filed April 28, 1954 4 Sheets-Sheet 3

Inventor
PIERRE RAOUL ROGER AIGRAIN

By Robert Harding Jr.
Attorney

IMPULSE MULTIPLYING ARRANGEMENTS FOR ELECTRIC COMPUTING MACHINES

Filed April 28, 1954

4 Sheets-Sheet 4

Inventor
PIERRE RAOUL ROGER AIGRAIN

By Robert Harding Jr.
Attorney 2,822,131

IMPULSE MULTIPLYING ARRANGEMENTS FOR ELECTRIC COMPUTING MACHINES

Pierre Raoul Roger Aigrain, Paris, France, assignor to International Standard Electric Corporation, New York, N. Y., a corporation of Delaware Application April 28, 1954, Serial No. 426,172

Claims priority, application France May 13, 1953

6 Claims. (Cl. 235—61)

The present invention relates to multiplying arrangements for electronic computing machines and in particular to computing machines in which the computations are made on the basis of the binary numerations system.

In such computing machines each number is represented by a group of impulses which represent the number in the binary numeration system, the said impulses being applied one after the other to the computing device.

Different types of multiplying devices operating in the binary numeration system are known. Most of those devices are based on the principle of a repeated summation. Such devices generally contain a large number of active elements, such as vacuum tubes, and they are, in particular, bulky and expensive.

One of the objects of the present invention is to provide a simple multiplying circuit which comprises only a small number of active elements, such as vacuum tubes.

According to one feature of the present invention, a multiplying circuit comprises in combination: a delay line having a plurality of taps regularly spaced; means for applying impulses representing a binary number successively to one extremity of the delay line, with the digit representing the lowest order denomination being applied first; means for applying impulses representing a second binary number successively to the other extremity of the delay line and in synchronism with the impulses applied to the first extremity, with the digit representing the lowest denomination being applied first, means at the various taps of the delay line for detecting the coincidences between the impulses applied to the two extremities of the delay line, the delay introduced by the delay line between successive taps being equal to half the interval of time separating two consecutive impulses applied to one extremity of the delay line.

According to another feature of the invention, the impulses obtained in response to coincidences of impulses at different taps of the said delay line are applied to regularly spaced corresponding taps of a second delay-line provided in order to introduce a total delay less than the delay introduced between two successive taps of the first delay-line.

According to another feature of the invention, the impulses obtained at the output of the second delay-line are applied to an arrangement comprising a plurality of circuits with two stable conditions connected in chain formation, the arrangement further comprising means adapted to control the first two-stable-condition circuit of the chain by means of output impulses from the second delay-line, means for returning the said circuits to their normal predetermined state, the said means being exactly adapted to give an output impulse every time a circuit is in the different condition from the predetermined condition, means for controlling the operation of the said means to return the said circuits to their initial condition at the end of each period during which the impulses corresponding to simultaneous coincidences with the taps of the first delay line appear at the output of the second delay-line, means associated with each circuit, except the first, to apply the impulses appearing at the output thereof to the input of the first circuit with a delay proportional to the denomination of the binary digit registered on said circuit, and means for applying output impulses of the first circuit to the output terminal of the multiplying arrangement.

Other objects, features and advantages of the present invention will appear clearly at the reading of the following description of an embodiment, the said description being made in connection with the accompanying drawings in which.

Figures 1, 2:
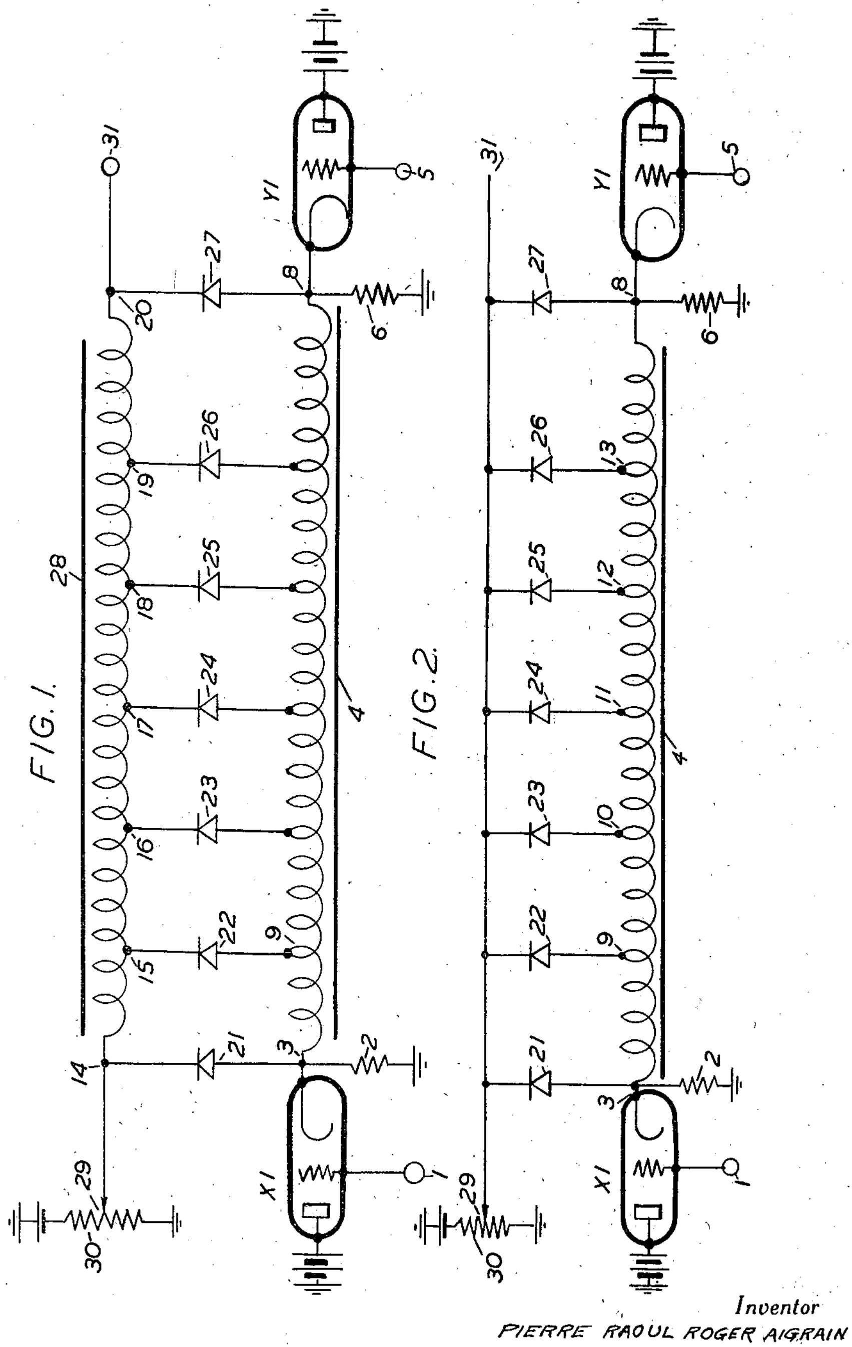
Fig. 1 represents schematically an embodiment of a multiplying circuit incorporating features of the invention.
Fig. 2 represents an embodiment of the simplified circuit of Fig. 1.

The electronic multiplying circuit represented in Fig. 1 is provided to multiply two binary numbers comprising four significant binary digits. It is evident that in most of the problems which are solved by electronic computing machines numbers having a much greater number of binary significant digits are used, thirty for example. Modifications of the circuit shown in Fig. 1 in order to use a greater number of significant digits will appear clearly to those skilled in the art.

It will be also assumed that each impulse characterising a binary digit is separated from the following impulse by 10 microseconds. It will be assumed, for example, that it is desired to multiply a number $X=9$ by a number $Y=12$. The numbers X and Y are therefore represented in the binary numeration system respectively by 1001 and 1100, the symbol 1 indicating the presence of an impulse and the symbol 0 indicating the absence of an impulse.

The impulses characterising number X are applied at terminal 1 under the form of positive impulses to the grid of triode X1, operating as an amplifier with a cathode load. Positive impulses obtained at the terminals of the cathode resistance 2 are applied to the input terminal 3 of a delay line represented schematically at 4. Likewise, positive impulses characterising digit Y are applied at terminal 5 to the grid of triode Y1, and impulses obtained at the terminals of the cathodic resistance 6 are applied to the other extremity 8 of the delay line 4.

The delay line 4 may have $n$ sections. The embodiment shown has six sections and introduces a total delay of 30 microseconds, and it has intermediary taps 9, 10, 11, 12 and 13, spaced at five microseconds intervals. Taps 3, 9, 10, 11, 12, 13 and 8 of the delay line 4 are connected respectively by diodes 21 to 27 to the corresponding taps 14, 15, 16, 17, 18, 19 and 20 of a second delay line 28. The delay line 28 has the same number of sections as the delay line 4 which in this case is six, and a total delay of 3 microseconds is introduced. The taps provided along this delay line are separated by a half microsecond. The extremity 14 of the delay line 28 is connected to the tap 29 of a potentiometer 30 in order to bias the diodes connected between the two delay lines. The potential of point 14 must be such that rectifiers 21—27 become conductors only when two impulses arrive in coincidence at one of the points 3—8, The operation of the circuit will be explained first of all, assuming that all the cathodes of diodes 21—27 are connected to point 14, as is represented in Fig. 2, where identical element to those of Fig. 1 are assigned the same reference characters. It will be necessary to refer to the table of Fig. 3 in which vertical lines represent different taps of the delay line 4 have been indicated by the same reference numerals as in Figs. 1 and 2. Each of the cases A—G show the positions of different impulses at successive instants at five microsecond intervals from the moment the first impulse is applied. The symbols shown at the upper part of the space representing each case concern number X and those shown at the lower part concern number Y. It is also assumed that the impulse representing the digit of the lowest order (beginning from right in the usual manner of writing numbers) is applied first to the machine.

Figure 3:
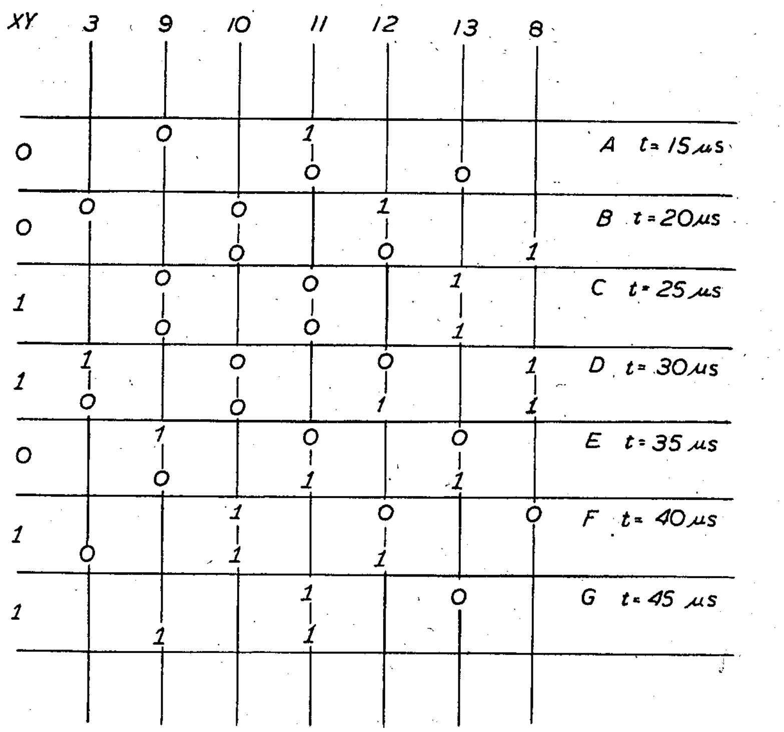
Figs. 3 and 4 are tables used for an explanation of the operation of the circuits shown in Figs. 1 and 2.

With respect to Fig. 3, it will be noticed that the set of symbols representing number X moves from the left to the right and the set of symbols representing number Y moves in the opposite direction. From explanations which have been given it is easy to understand the mode of establishing the diagram of Fig. 3. The instants indicated on the right side of the diagram are counted from the moment at which the first impulse is applied to the extremities of the delay line 4. A coincidence is produced at the tap 13 at the instant 25; at the tap 8 at the instant 30; at the tap 10 at the instant 40; and at the tap 11 at the instant 45. The resultant product is obtained by ascertaining the succession of impulses or lack of impulses appearing at the output 31 (Fig. 2) beginning when the first digit of the two-numbers, coming from opposite directions coincide at one of the taps. It is easy to see that the output impulses obtained successively at 31 through the diodes, owing to coincidences of the digits of the two numbers 1001 and 1100, produce the binary number 1101100 which represents the number 108 in the decimal system, the binary digit of the lowest denominational order being obtained when the two first impulses applied reach the tap 11, that is to say, 15 microseconds after the application of the two first impulses in the considered example.

With relation to Fig. 2 which shows a particular case of realisation, an example of an operation has been considered in which there is no case of two or more coincidences occurring simultaneously at two or more taps of the delay line 4.

Figure 4:
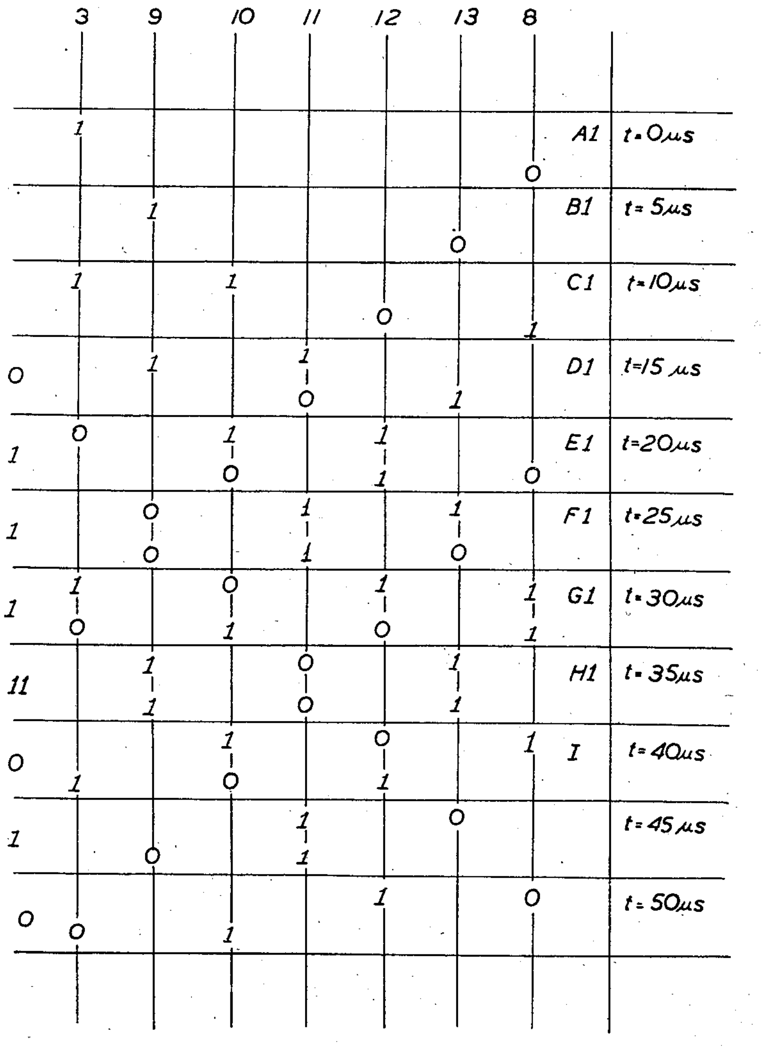

In Fig. 4, which must be considered in relation with Fig. 1, the case of the multiplication of the number 11 (1011 in the binary numeration system) by the number 10 (1010 in the binary numeration system) has been shown, and it may be seen that two coincidences happen at the 35th microsecond at taps 9 and 13 of the delay line 4. It is easy to see that the two impulses characterising the two coincidences occurring simultaneously at taps 9 and 13 at the instant $t=35$ $\mu$s., arrive at the output terminal 31 at the instants $t=37.5$ $\mu$s. and $t=35.5$ $\mu$s. respectively. The instants at which the characteristic impulses of coincidences arrive at terminal 31 are indicated on Table 1.

TABLE 1

| Instant of time at which the coincidence takes place | Tap of the delay line 4 wherein the coincidence takes place | Instant of time of arrival of the corresponding impulse at terminal 31 |
|---|---|---|
| 15 µs. | 0 | 0 |
| 20 µs. | 12 | 21 µs. |
| 25 µs. | 11 | 26.5 µs. |
| 30 µs. | 8 | 30 µs. |
| 35 µs. | 9 | 37.5 µs. |
| 35 µs. | 13 | 35.5 µs. |
| 45 µs. | 11 | 46.5 µs. |

Figure 5:
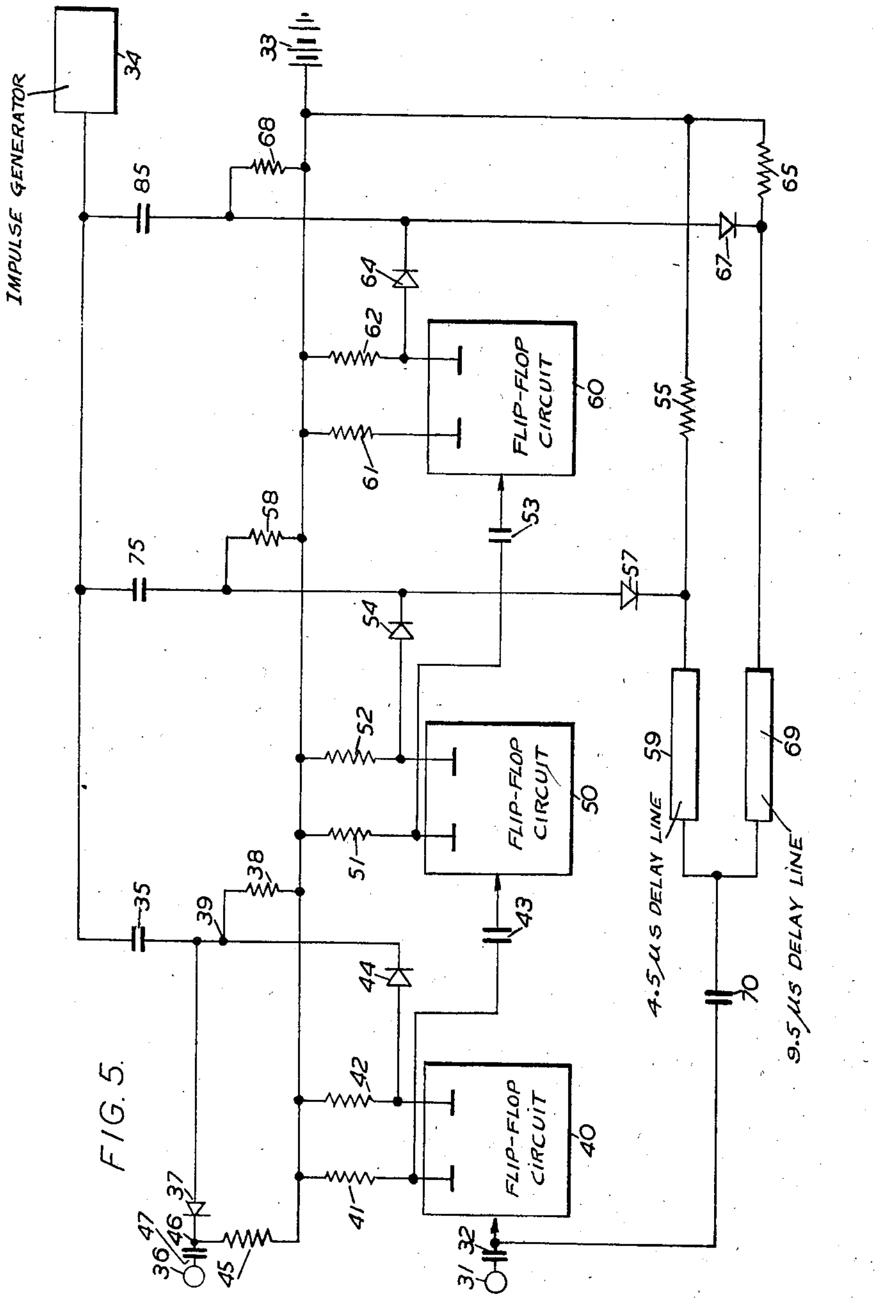
Fig. 5 shows schematically an embodiment of the adding device for providing carry-over.

Reference will now be made to Fig. 5 representing the output circuit of the multiplying arrangement. There have been shown three flip-flop circuits 40, 50, and 60 which may also be conventional circuits utilising a pair of vacuum tubes or a pair of gas tubes inter-connected in order to have two stable conditions. To simplify the drawing, only the anodes of the flip-flop tubes have been represented inside a square connected to the associated resistances 41, 42; 51, 52; 61, 62.

The control impulses, derived from the output terminal 31 of the delay line 28 (Fig. 1), are applied to the input of the flip-flop circuit 40 by means of the condenser 32. The anode of the tube on the left hand side of each of the first two flip-flop circuits is connected to the input of the following flip-flop circuit by means of condensers 43 and 53, respectively. A source of high voltage 33 is connected to the extremities of the anode resistances of all the flip-flop circuits. A generator 34 supplies impulses at the instants of time 4.5 $\mu$s.$+n$ times 5 $\mu$s., the origin of time being the same as that on the table of Fig. 4. When the circuit is at rest, the tubes on the left hand side are blocked and the tubes on the right hand side are conducting.

If it is assumed that the flip-flop circuit 40 is at rest, the potential of the anode associated with the resistance 42 is negative with respect to the source of high voltage 33, in order that a negative impulse, applied over condenser 35 from the impulse generator 34, has no effect either on the output terminal 36, owing to the direction in which the rectifier 37 is connected, or on the anode associated with resistance 42. On the other hand, the resistance 38 is provided in order that the time constant of the charge of condenser 35 be very high, in order that substantially no positive tops of impulses or signals will appear at the output terminal 36. If the flip-flop circuit is in the position in which the tube 42 is blocked, rectifier 44 becomes conductive when a negative impulse is applied from the generator 34 and, provided that the resistance 42 has a value much lower than that of resistance 38, the condenser 35 is charged appreciably during the time of the negative impulse. The negative impulse applied to the anode associated with the resistance 42 (and thus to the grid of the left hand tube) causes the return of the flip-flop circuit to its rest position. On the other hand, at the end of the negative impulse of generator 34, a positive impulse appears at point 39 and the rectifier 37 becomes conducting. The current which flows through resistance 45 causes the appearance of a positive impulse at point 46, and this impulse is applied by condenser 47 to the output terminal 36.

When the flip-flop circuit 40 returns to its rest position, the anode of the left tube becomes positive, thus delivering a positive impulse via the condenser 43 to the flip-flop circuit 50. However, this flip-flop circuit does not operate at this time, because a negative impulse is simultaneously received by it from the generator 34 over condenser 75 and rectifier 54 which cancels the positive impulse from the flip-flop circuit 40.

The elements 54, 55, 57, 58, 75 associated with the flip-flop circuit 50 and the elements 64, 65, 67, 68, 85 associated with the flip-flop circuit 60 fulfil respectively the same functions as those of the elements 44, 45, 37, 38 and 35 associated with the flip-flop circuit 40. The output impulses of the flip-flop circuit 50 are applied to the input terminal of the flip-flop circuit 40 through a delay line 59 which introduces a delay of 4.5 microseconds, whilst the impulses obtained at the output of the flip-flop circuit 60 are applied to the input terminal of the flip-flop circuit 40 through a delay line 69 which introduces a delay of 9.5 microseconds.

The operation of the circuit shown in Fig. 5 will now be considered when there are applied to the input terminal 31 the impulses obtained at the terminal 31 of the circuit, shown in Fig. 1, in the case described in connection with Fig. 4. The first output impulses from the delay line 28 is applied 21 microseconds after the beginning of the operation: it causes the passage of the flip-flop circuit 40 to its second stable condition in which the anode associated with the resistance 42 is at the positive potential of the source of high voltage. The fifth output impulse from generator 34 is applied 24.5 microseconds (4.5 microseconds+5 microseconds×4) after the instant 0, so that the flip-flop circuit 40 is brought back into the position of rest, and one impulse appears at the output terminal 36, as has already been described. No effect is produced on flip-flop circuit 50. The second output impulse from the delay line 28 (Fig. 1) appears 26.5 microseconds after the instant of time 0, causing the change of condition of the circuit 40 which is brought back to rest by the next impulse of generator 34 which appears 29.5 microseconds after the instant 0. An output impulse then appears on terminal 36. Again no effect is produced on flip-flop circuit 50. The impulse applied to terminal 31, 30 microseconds after the instant 0 also causes the appearance of an output impulse at terminal 36, 34.5 microseconds after the instant 0 with no effect on circuit 50.

Between the output impulse from generator 34 which appears at 34.5 microseconds and the following impulse, two impulses are applied to the input terminal 31 in order to cause the flip-flop circuit 40 to operate twice, the second impulse returning it to its rest position. This causes a positive impulse to be applied over condenser 43 from the anode of the left hand tube of circuit 40 to the flip-flop circuit 50. This time there is no negative impulse from the generator 34 and the flip-flop circuit 50, therefore, changes to its second stable position. The impulse from generator 34 which appears later at 39.5 microseconds is then without any effect on the flip-flop circuit 40, but it causes the return to rest position of the flip-flop circuit 50, thus applying, by means of rectifier 57, an impulse at the input of the delay line 59. This impulse is subjected to a delay of 4.5 microseconds, before being applied by condenser 70 at the input of the flip-flop circuit 40, which then passes to its second position 44 microseconds after the instant 0. It follows that the following impulse from generator 34, at 44.5 microseconds, causes the appearance of an output impulse at the terminal 36. In this manner a carry over operation has been made, the two impulses applied at the input terminal giving 0 (absence of impulse at the output terminal) with the carry over of 1 on the following binary digit. It is easy to understand that the impulse applied to terminal 31, 46.5 microseconds after the instant 0, causes the appearance of an output impulse at the terminal 36, 49.5 microseconds after the instant 0.

In the example chosen, only the case of a carry over on the following digit has been considered, two input impulses being applied to the terminal 31 between two impulses from generator 34. It is easy to understand that a greater number of impulses may be applied to the input terminal between two successive impulses from generator 34. If, for example, four impulses are applied to terminal 31 between two successive impulses from generator 34, the flip-flop circuit 40 operates four times, the last operation being a return to its rest position; the flip-flop circuit 50 operates twice, the second operation being a return to its rest position; and the flip-flop circuit 60 passes to its second stable position. When the following output impulse from generator 34 is applied to the circuit, it is without effect on the flip-flop circuits 40 and 50, but it causes the return to the rest position of the flip-flop circuit 60 and the application of an impulse to the input of the delay line 69. This impulse is subjected to a delay of 9.5 microseconds and is then applied by condenser 70 to the input of the flip-flop circuit 40, so that the carry over is made on the second binary digit after the considered digit.

It will be understood that, although only two carry over circuits 50, 60 have been shown, a greater number of such circuits could be provided, according to the binary digits of the numbers to be multiplied.

While the principles of the invention have been described above in connection with specific embodiments and particular modifications thereof, it is to be clearly understood that this description is made only by way of example and not as a limitation on the scope of the invention.

What is claimed is:

1. A multiplying arrangement for electronic computing machines characterized in this that the arrangement comprises delay line means having end terminals, means at the ends of said delay line means for respectively applying to said end terminals successions of impulses representing the binary equivalent of two numbers to be multiplied together having equally spaced impulse positions, a plurality of taps on said delay line means, there being a delay between every two taps equal to half the time between adjacent impulse positions, and gating means connected to each tap for producing an output therefrom only when two impulses appear simultaneously at said tap.

2. A multiplying arrangement, as defined in claim 1, in which the gating means connected to each tap comprises a rectifier, poled so as to permit current to flow from said tap, and means for biasing said rectifier for blocking the flow of current when the potential at said tap is less then the sum of the potentials of two impulses, one from each end of the delay line.

3. A multiplying arrangement, as defined in claim 1, further comprising common output means for the taps, said output means comprising means for providing a time separation within predetermined limits between impulses produced simultaneously by a plurality of taps.

4. A multiplying arrangement, as defined in claim 3, further comprising circuit means connected to the common output means for passing output impulses representing the binary equivalent of the product of the two numbers, said circuit means being responsive to impulses received from said common output means which are spaced in time within the predetermined time separation limit for witholding an impulse and adding carryover impulses to succeeding denominations of the product number depending on the number of the impulses within the predetermined time separation limit.

5. A multiplying arrangement, as defined in claim 4, in which the circuit means comprises a plurality of flip-flop circuits each having two conditions of operation one of which is a normal condition; said flip-flop circuits being arranged in a chain with the output of each connected to the input of the succeeding one, each flip-flop circuit adapted to shift to its other condition of operation when an impulse is applied to its input, regardless of what condition it is in when said impulse is applied, means for producing a succession of impulses equally spaced in time and having the same time duration between impulses as between binary number impulse positions, means for applying said impulses from said impulse producing means to all said flip-flop circuits, means in each flip-flop circuit responsive to an impulse from said impulse producing means for returning said flip-flop circuit to its normal condition if it is not in such condition, means for producing an output impulse from said circuit means when the first flip-flop circuit changes to its normal condition simultaneously with the production of an impulse from said impulse producing means, means for operating a next succeeding flip-flop circuit when a flip-flop circuit returns to its normal condition without the simultaneous production of an impulse from said impulse producing means, means connected to each flip-flop circuit, except the first, and controlled thereby, for causing the termination of an impulse from said impulse producing means to transmit an impulse to the input of said first flip-flop circuit if the associated flip-flop circuit has just been returned to its normal condition by the impulse from said impulse producing means, and delay means in each transmitting means having a delay greater than the delay of the delay means associated with the preceding transmitting means by the time duration between impulses from said impulse producing means, the delay being such as to cause the transmitted impulse to arrive at said first flip-flop circuit shortly before an impulse from said impulse producing means is due to arrive.

6. A multiplying arrangement, as defined in claim 5, in which the transmitting means connected to each flip-flop circuit, except the first, comprises a condenser, and means to charge said condenser during the period of an impulse from said impulse producing means if the associated flip-flop circuit is at that time in its other-than-normal condition.

References Cited in the file of this patent

UNITED STATES PATENTS 2,410,233 Percival ---------------- Oct. 29, 1946
2,635,229 Gloess et al. ------------ Apr. 14, 1953